United States Patent [19]
Snyder

[11] Patent Number: 5,812,730
[45] Date of Patent: Sep. 22, 1998

[54] LIGHT DISSIPATING SPRING INTERCONNECTION BETWEEN LIGHTGUIDES

[75] Inventor: Thomas D. Snyder, Raleigh, N.C.

[73] Assignee: Ericsson Inc., Research Triangle Park, N.C.

[21] Appl. No.: 695,437

[22] Filed: Aug. 12, 1996

[51] Int. Cl.$^6$ .................................................. G02B 6/10
[52] U.S. Cl. .................................................. 385/147
[58] Field of Search ................................. 385/147, 140, 385/146, 123, 68, 84, 85; 200/314, 317, 313, 310

[56] References Cited

U.S. PATENT DOCUMENTS

| | | | |
|---|---|---|---|
| 4,772,769 | 9/1988 | Shumate | 200/314 |
| 5,252,798 | 10/1993 | Kamada | 200/314 |
| 5,321,790 | 6/1994 | Takahashi et al. | 385/140 |

OTHER PUBLICATIONS

Patent Abstract of Japan, vol. 096, No. 003, Mar. 29, 1996, Japanese Pub. No. 07–307123.

*Primary Examiner*—Akm E. Ullah
*Attorney, Agent, or Firm*—Nixon & Vanderhye P.C.

[57] ABSTRACT

Disclosed is a one piece lightguide structure having at least two lightguides, one of which can be movable with respect to the other. In a preferred embodiment, the lightguides are interconnected by a restricted light path structure, in a preferred embodiment, a light dissipating spring which mechanically interconnects the two lightguides but serves to restrict any light transmitted from one lightguide to the other. The light path restriction is created by dispersing any light transmitted along the spring, reflecting light back towards the originating lightguide, trapping light in various larger cross-sectional area portions or varying combinations of all three. In a preferred embodiment, a light dissipating spring comprising the three large cross-sectional areas connected in series between a fixed lightguide and a movable lightguide by smaller cross-section portions which serve to mechanically interconnect two lightguides.

14 Claims, 4 Drawing Sheets

LIGHT DISSIPATING SPRING INTERCONNECTION BETWEEN LIGHTGUIDES

BACKGROUND OF THE INVENTION

1. Field of the Invention

The present invention generally relates to translucent or transparent lightguides and specifically to a common molding of two lightguides, connected to each other through a light dissipating spring, for movement of one with respect to the other.

2. Description of the Prior Art

The use of lightguides made of transparent or translucent rubber, glass, plastic or other such light conducting material have found increasing usage in the construction of modern conveniences. It has become conventional to locate light sources such as light emitting diodes, miniature incandescent lamps, etc., on a printed circuit board with other electrical components and then optically conduct light from the light source through an appropriate lightguide to the desired location for display. Lightguides typically operate by having a relatively smooth surface and a circular oval, rectangular or other convenient cross-section. Light injected at one end of the lightguide is internally reflected off of the walls of the lightpipe until it exits the light guide at the other end. Lightguides can be relatively small structures and in some instances are essentially fiber optic cables.

Where a device requires a plurality of lightguides, the construction and assembly of such products is enhanced if the lightguides can be created out of the same material and injection molded or otherwise created as a single integrated element. Unfortunately, with such integrated lightguides comes the problem of "cross-talk" between the various lightguides by way of the interconnecting lightguide material. If one of the lightguides is transporting blue light and the other is transporting red light, it is desirable to maintain the frequency separation between the light visible at the output end of the lightguides so as to not obtain varying shades of purple.

Additionally, there are situations in which some lightguides are fixed with respect to the product case while other lightguides may be movable with respect to the case in order to activate switches or other elements of the device. If the lightguides are integrally molded, with an interconnecting structure, it may be difficult or impossible to obtain the desired relative movement of the movable lightguide with respect to the fixed lightguide and case.

SUMMARY OF THE INVENTION

In accordance with the above discussion, it is an object of the present invention to provide a plurality of lightguides in a single integrally connected structure where "cross-talk" between the lightguides is eliminated or at least minimized.

It is a further object of the present invention to provide a plurality of lightguides in which at least one lightguide is movable with respect to the other lightguides even though they are integrally molded from the same structure.

It is a further object of the present invention to provide an integrally molded structure having a fixed lightguide and a movable lightguide with the movable lightguide attached to the fixed lightguide by means of a mechanical spring.

The above and other objects are achieved in accordance with the present invention by providing movable and fixed lightguides with a restricted light path structure integrally molded between the two lightguides. This restricted light path structure in preferred embodiments incorporates one or more bends in its mechanical connection between the two lightguides so as to reduce light so as to restrict the transmission of light from one lightguide to the other.

In a preferred embodiment the interconnections between the lightguides through the spring comprise an indirect light path between the lightguides. In a further preferred embodiment, the spring connection comprises portions having a relatively larger cross-sectional area interconnected with portions having relatively smaller cross-sectional areas. Only a small amount of the light transmitted into a relatively large portion is passed through the relatively small portion connection to an adjacent relatively large portion. In a further preferred embodiment, the relatively large and/or relatively small portions have textured surfaces to enhance transmission of light contained therein to a location outside the light dissipating spring rather than being conducted to the adjacent lightguide.

BRIEF DESCRIPTION OF THE DRAWINGS

The above, as well as other advantages and features of this invention, will be more completely understood and appreciated by review of presently preferred exemplary embodiments taken in conjunction with the accompanying drawings, of which.

DETAILED DESCRIPTION OF PREFERRED EMBODIMENTS

In discussion of the preferred embodiments illustrated in the accompanying drawings, similar numbering will be used for similar structures among these several views.

Figure 1:
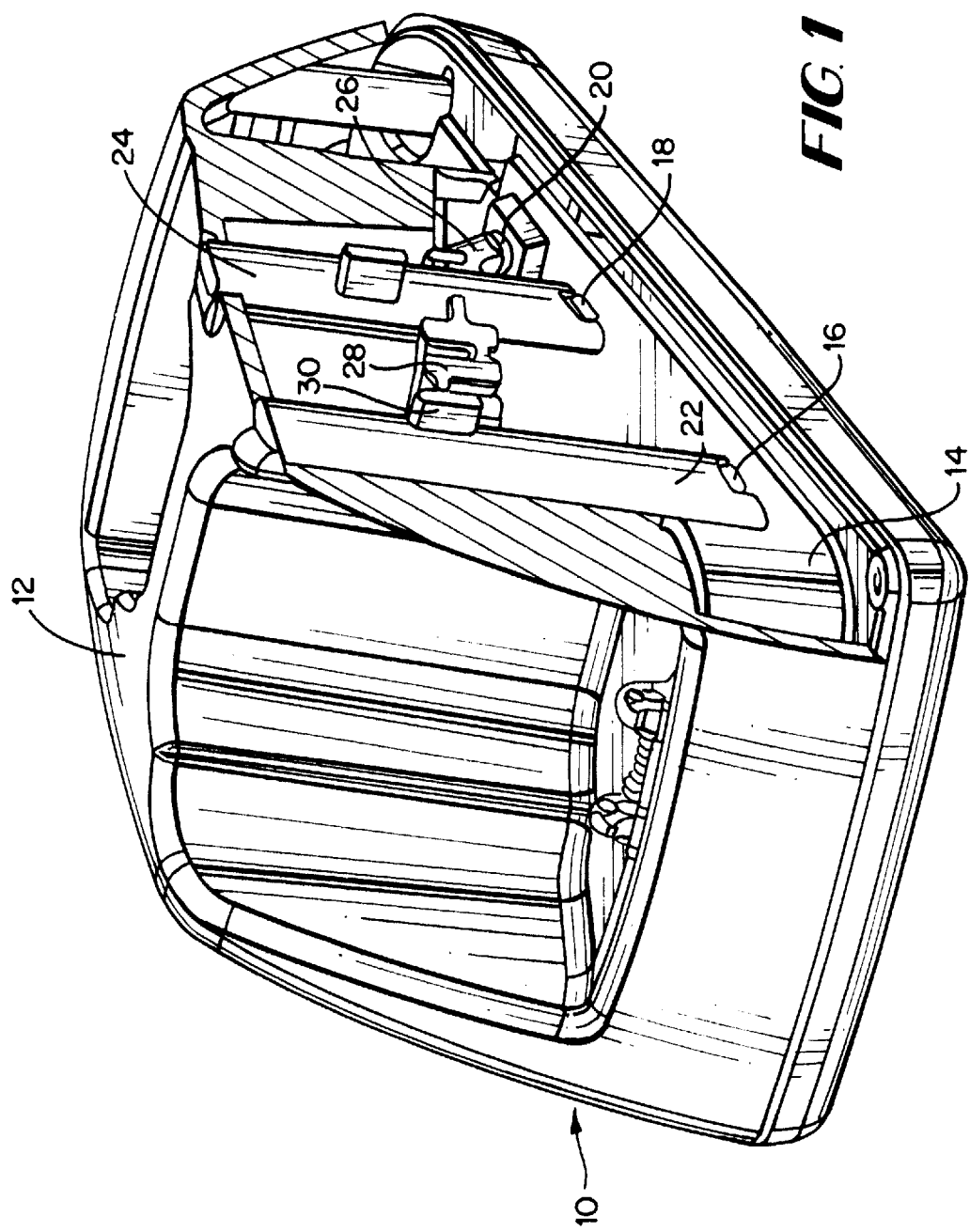
FIG. 1 is a partial section view of a battery charger incorporating a preferred embodiment of the present invention.

In FIG. 1, one example of a product embodying the present invention is illustrated. A battery charger 10 includes an external case 12 having therein a printed circuit board 14 which, in a preferred embodiment, includes electronic structures mounted thereon necessary for the battery charger's operation. Mounted on the printed circuit board 14 are light emitting diodes (LEDs) 16 and 18 for indicating electronic operations to the user of the battery charger. In addition, microswitch 20 is also conveniently mounted on the printed circuit board 14 and, in a preferred embodiment, serves to perform a battery discharging operation prior to battery charge.

In order to avoid the necessity of the operator being able to view the printed circuit board portion where the light emitting diodes 16 and 18 are located and to directly manipulate microswitch 20, a preferred embodiment of the battery charger 10 includes a fixed lightguide 22 and a movable lightguide 24 (capable of actuating the microswitch). As can be seen, the fixed lightguide conveys light emitted by LED 16 to the surface of the battery charger case 12 where it is visible to the battery charger user. In a similar fashion, light from LED 18 is conveyed along movable lightguide 24 which, by means of arm 26, is able to actuate microswitch 20 when the upper portion of movable lightguide 24 is depressed by the operator.

Figure 2:
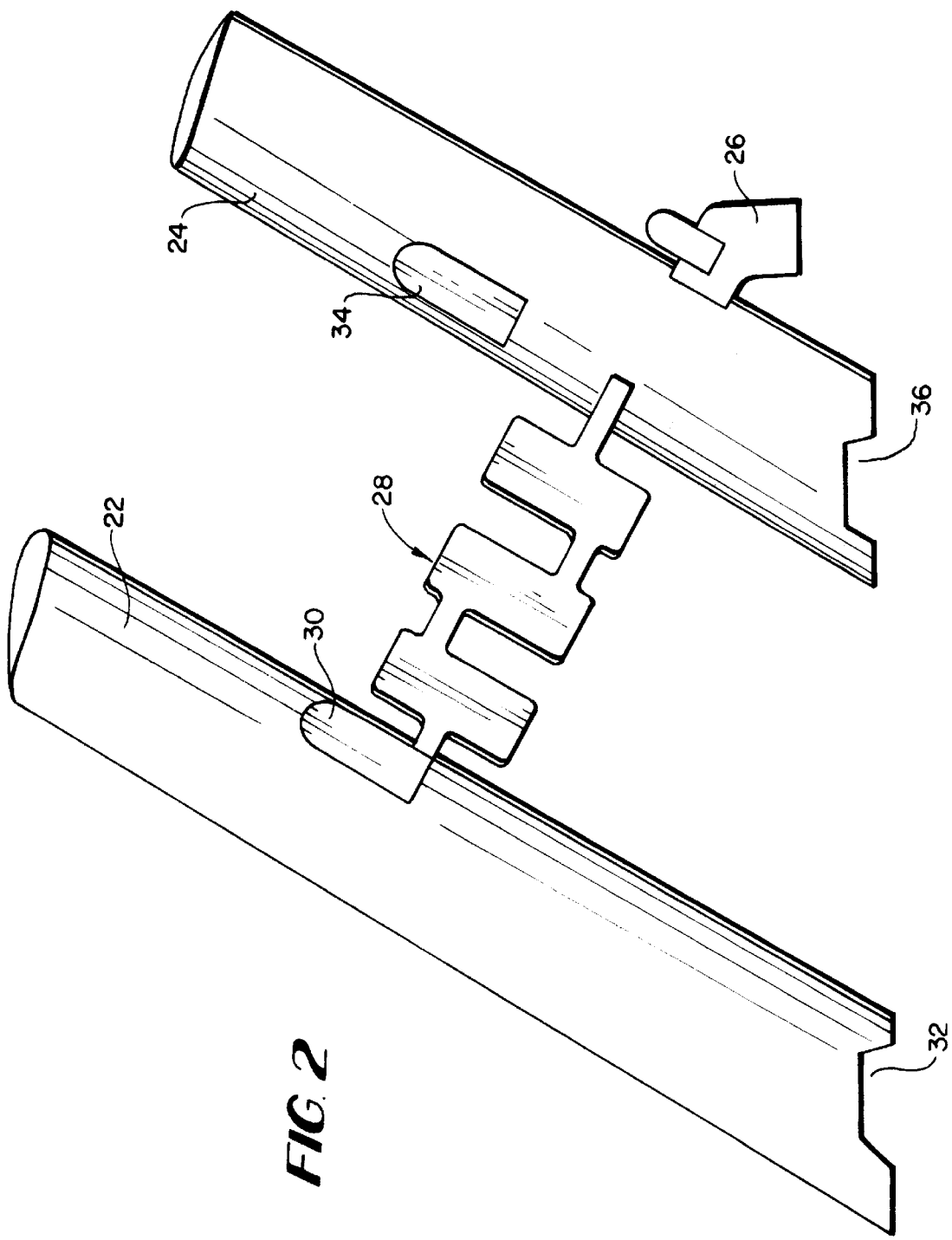
FIG. 2 is an enlarged view of a fixed and movable lightguide interconnected by a light dissipating spring in accordance with the present invention.
Figure 3:
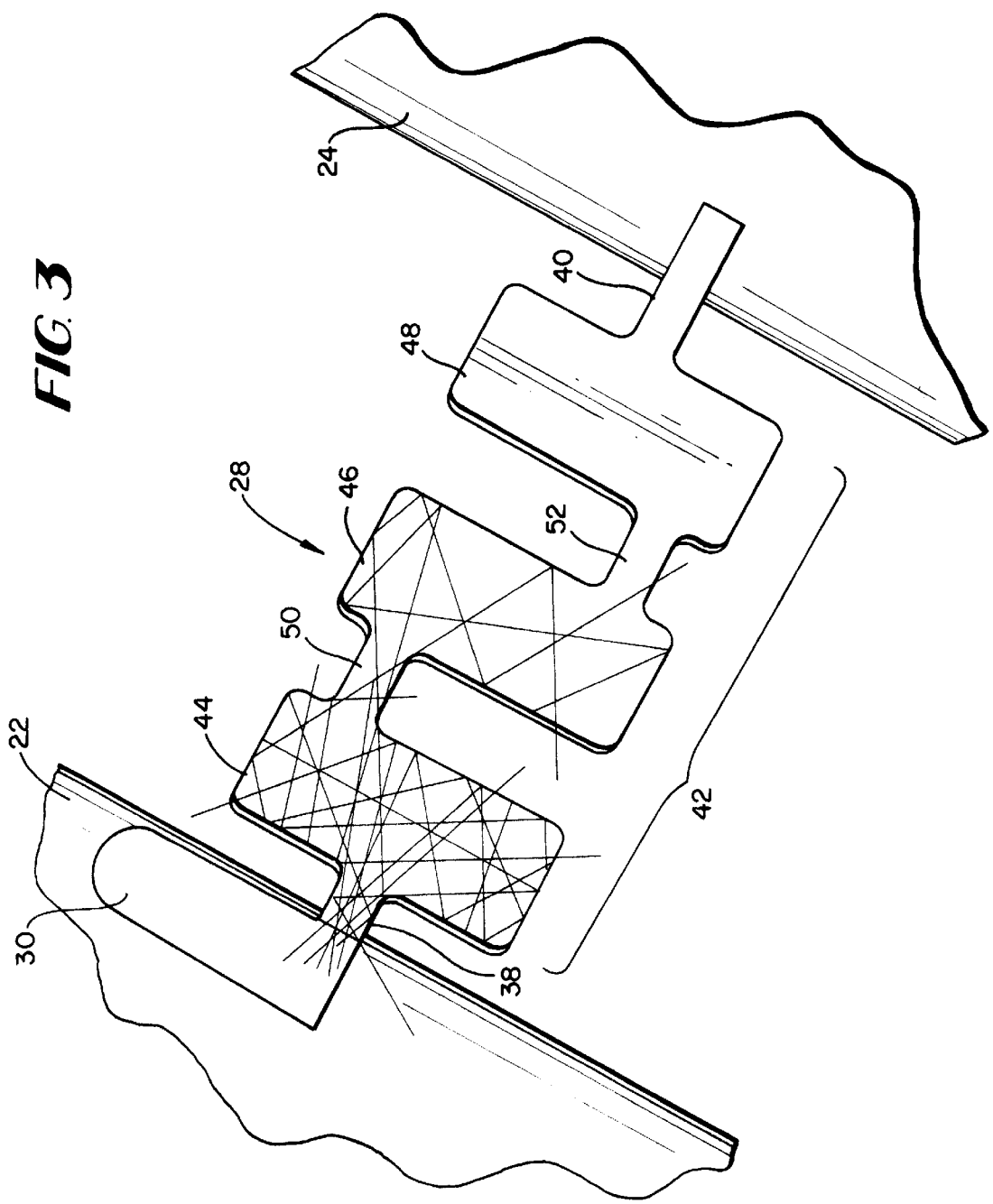
FIG. 3 is an enlarged view of the light dissipating spring of FIG. 2 illustrating possible light paths in the spring.

Interconnecting the fixed and movable lightguides is a restricted light path structure which, in FIGS. 1–3 is light dissipating spring 28. This spring is comprised of the same material as the lightguides which in a preferred embodiment is a clear polycarbonate but could be a clear acrylic or any light translucent or light transparent glass, plastic, rubber or other light conducting material. The light dissipating spring, which interconnects the two lightguides, permits the lightguide/spring/lightguide combination to be injection molded or otherwise constructed as a single integral unit. This construction not only simplifies the parts count in the battery charger but also reduces installation time since only a single part has to be inserted instead of separate components.

Fixed lightguide 22 includes projection feature 30 which can extend into a recess in the case thereby serving to fix the fixed lightguide into place and prevent its movement relative to the LED 16. A recess 32 permits the lower end of the lightguide to rest on or adjacent to the printed circuit board and to gather the maximum amount of light generated by LED 16.

Movable lightguide 24 also may include a fixture 34 which, in a preferred embodiment, may move within a groove located in the battery charger case to thereby limit the direction of movement of the lightguide and arm 26 to a direction for operating microswitch 20. The movable lightguide 24 also includes a recess 36 although sufficient clearance must exist between the bottom of the lightguide and the printed circuit board when mounted so as to permit sufficient downward movement of the lightguide to activate microswitch 26 prior to the lightguide contacting the printed circuit board.

As can be seen in FIG. 1 and perhaps more clearly in FIG. 2, while movable lightguide 24 is located for movement along its axis by the fixture 34 and the accompanying structure of the case, it is biased into a position along that axis by the light dissipating spring 28. Spring 28, by virtue of its shape and the material, has sufficient mechanical resilience to permit the movable lightguide 24 to move downward, when the top of the lightguide 24 is depressed by the user, a sufficient amount allowing actuation of the microswitch 20 by arm 26. Upon the user releasing the upper portion of the lightguide, the mechanical resilience of spring 28 causes the lightguide to move upward to a "rest" position in which arm 26 does not depress the microswitch.

Although the orientation and interrelationship of the lightguides 22 and 24 in FIGS. 1 and 2 are shown to be slanted, they could as easily be located in a vertical or horizontal or any other convenient direction. There is no requirement that the lightguides be parallel and indeed they can have any angle with respect to each other. Further, although only two interconnected lightguides are shown for the purpose of clarity of illustration, a plurality of lightguides, some or all of which are movable or fixed, could be combined utilizing the present invention. Furthermore, while generally longitudinal movement of the movable lightguide is illustrated, the mounting of a lightguide for rotary movement relative to another lightguide or with respect to its axis is also envisioned. Additionally, while the lightguides are shown in the battery charger example as having a generally teardrop or airfoil shape, is understood that any desired cross-sectional shape could be incorporated in the lightguide and the shape is dependant only upon the desired external appearance at the surface of the case and any size constraints caused by the available space within the case.

Reference may be had to FIG. 3 which provides a clearer understanding of the operation of the light dissipating spring. As discussed previously, it is desirable to optically isolate the lightguides from each other even though they are a single integral unit. Applicant accomplishes this optical isolation by providing a restricted light path while at the same time providing a mechanical path which permits relative deflection between the two lightguides.

The light dissipating spring interconnecting fixed lightguide 22 and movable lightguide 24 is comprised of a relatively small (in the optical sense) cross-section portions 38 and 40 connecting the restricted lightpath 42 to the fixed and movable lightguides, respectively. Because these smaller portions are necessarily comprised of the same material as the lightguides, their ability to conduct light from the lightguide into the restricted lightpath is unfortunately relatively good. Therefore, it is desirable to prevent or at least substantially reduce any light transmitted from one small cross-section portion to its counterpart and from there into the adjacent lightguide. This is accomplished by utilizing a relatively larger area cross-section portion located between the two smaller portions which permits the light from one smaller portion to diffuse and permits only a smaller portion of the diffused light to travel to the adjacent lightguide.

FIG. 3 illustrates the restricted lightpath of light traveling from the fixed waveguide towards the movable waveguide, but it is understood that a similar light path would exist with respect to light traveling from the movable lightguide to the fixed lightguide. The light from the small portion is transmitted into a series of optically large cross-section portions 44, 46 and 48. It can be seen that the small amount of light traveling through the relatively small portion 38 is dissipated to a substantial degree when it fills the larger portion 44. The average light intensity in the larger portion 44 is thus much less than the light intensity inside the small portion 38. Large portion 44 is connected to large portion 46 by a small portion 50 which may be similar in size and shape to the small portions 38 and 40.

Small portion 50 conveys only a fraction of the lower intensity light in large portion 44 to the adjacent large portion 46, whereupon this low intensity light is further dispersed to an even lower intensity. Only a portion of this lower intensity light is transmitted via small portion 52 into large portion 48. Causing a further dispersion and lowering of intensity of any light transmitted. Finally, only a small portion of any light admitted to large portion 48 is actually transmitted to lightguide 24 by small portion 40. It can be seen that while a single large portion interconnecting the two lightguides 22 and 24 would serve to provide a substantial reduction, a greater reduction is achieved by the preferred embodiment utilizing three large portions.

As a further improvement in isolating light in one lightguide from another connected lightguide, it can be seen that the small portion 50, which connects large portions 44 and 46, is not located directly in line with small portion 38. This orientation minimizes the possibility of light being transmitted directly through the two small portions into large portion 46 directly from lightguide 22. Similarly, small portions 50 and 52 are offset with respect to each other again to minimize any light transmitted from large portion 44 to large portion 48. The term "offset" as used herein indicates that the referred to components are located so as to reduce the possibility of any direct light transmission between the lightguides. It is noted that, in addition to preventing direct light transmission, the offset location of small portions 50 and 52 also enhance the flexibility of the spring permitting relative movement between fixed lightguide 22 and movable lightguide 24.

Figure 4D:
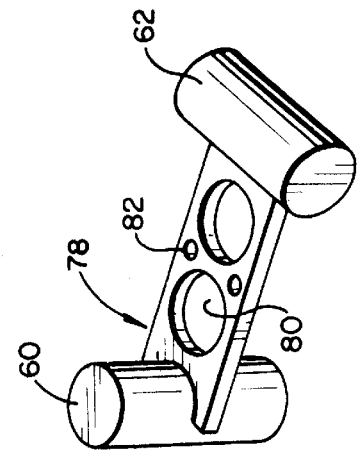
FIGS. 4A through 4D are perspective views of various additional embodiments of the present invention.
Figure 4B:
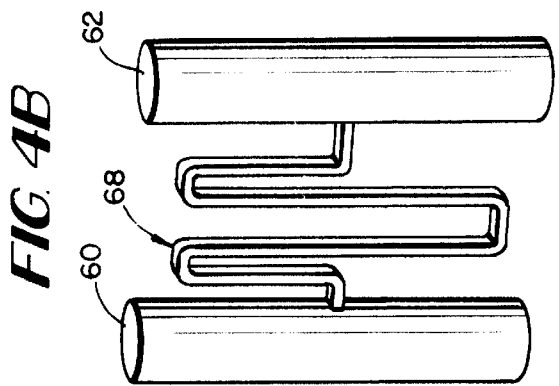
Figure 4A:
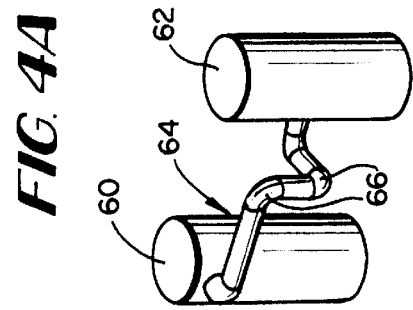

FIGS. 4A through 4D illustrate different embodiments of the restricted light path structures in the form of a light dissipating spring in accordance with the present invention. FIG. 4A discloses interconnected cylindrical lightguides 60 and 62 in which the restricted lightpath structure comprises a plurality of 90° bends between straight portions. As will be understood, a significant portion of light is lost from a lightguide when the lightguide makes a turn. Additionally, the amount of light lost from a lightguide can be increased by providing a textured surface (at least at the turn) rather than a smooth surface. Restricted lightpath structure 64 includes four 90° turns with at least a portion of the lightpath having a textured surface (see corners 66). In the embodiment of FIG. 4A, the bends in the connection between the lightguides are in different planes. In this embodiment the restricted lightpath has a generally circular cross-section.

FIG. 4B illustrates a restricted lightpath 68 which also includes parallel cylindrical lightguides 60 and 62. However, the restricted lightpath 68 is comprised of a rectangular cross-section having 90° bends in a common plane. Although the common plane in FIG. 4 includes both the lightguides 60 and 62 as well as the restricted lightpath 68, such is not necessary.

Figure 4C:
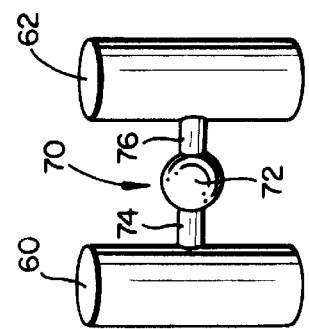

FIG. 4C illustrates parallel cylindrical lightguides 60 and 62 interconnected with a non-offset restricted lightpath 70. While the larger portions 44, 46, 48 illustrated in FIG. 3 had a rectangular cross-section, the larger portion sphere 72 of FIG. 4C has a circular cross-section. Sphere 72 is connected to lightguides 60 and 62 by way of smaller portions 74 and 76, respectively. Sphere 72 may include a textured surface to promote the transmission of light internal to the sphere through the textured surface to a location external to the sphere.

While FIGS. 4A–4C illustrated embodiments in which the two interconnected waveguides are oriented in parallel, FIG. 4D illustrates an embodiment in which the waveguides are in a non-parallel configuration. Waveguide 60 and 62 are connected with a planar form restricted light path 78 which has one or more apertures located therein. With respect to the cross-sectional area available for transmitting light, it can be seen that a large aperture 80 reduces the cross-sectional area of the restricted light path structure 78 to a greater extent than does a smaller aperture 82. These apertures also reduce the structural rigidity of the restricted lightpath 78 allowing relative movement between lightguides 60 and 62.

With reference to the above figures, it is noted that the lightguide and restricted light path structure, with or without a spring, concept can be implemented with a clear, tinted or colored semi-transparent and/or translucent material. It is observed that such lightguides can be utilized for splitting light from a single LED to provide that light at multiple locations without deviating from the spirit of the present invention. While applicants invention is directed primarily to a plurality of lightguides which are integrally formed with a restricted light path structure in the form of a light dissipating spring therebetween, applicants invention could be created in the form of a light dissipating spring which can be connected between existing lightguides, perhaps of slightly different material. It is understood that varying materials will provide different indices of refraction for the lightguide material thereby varying the incidence angle above which there is transmission of the light through the material and below which there is reflection of the light from the surface of the material. Appropriate combinations of materials and angles will enhance the transmission of light external to the light dissipating spring as it travels from one lightguide to the other lightguide. Accordingly, varying combinations of geometries, materials, lights and angles will minimize the potential for "cross-talk" between lightguides in accordance with the present invention.

As noted above, polished or extremely smooth surfaces on the lightguides will enhance internal light reflections (dependent upon the refractive index of the material and the angle of light travel) while textured surfaces will induce transmission of the light out of the material and into the adjacent air. For embodiments in which one lightguide is fixed, the fixing of the lightguide can be accomplished in many different ways such as securing the part in a housing, snapping it into a circuit board, trapping it between two assembled components, etc. Should one lightguide be designed to float or move in a desired direction in the assembly, it also can be designed to move in appropriate channels thereby allowing the spring to flexibly interconnect the relatively moving lightguides during their movement. Movement of a lightguide can serve not only to actuate a microswitch on a circuit board or a toggle switch located apart from the externally viewed portion of the lightguide, but could also provide indications of changing switched position as a switch is mechanically actuated.

Accordingly, in view of the above disclosure, many modifications and embodiments of the light dissipating spring invention will be obvious to those of ordinary skill in the art. Accordingly, the present invention is limited only by the designers imagination and the specific claims as follows:

What is claimed is:

1. A structure for mechanically interconnecting at least two lightguides where one of said at least two lightguides is optically insulated from another of said at least two lightguides, said structure comprising:

a restricted light path structure optically insulating said one of said at least two lightguides from said another of said at least two lightguides;

a mechanical and optical connection between said restricted light path structure and said one of said at least two lightguides; and a mechanical and optical connection between said restricted light path structure and said other of said at least two lightguides.

2. A light dissipating spring for integrally interconnecting at least two lightguides, said lightguides moveable relative to each other and comprised of a light transmissive material, said spring comprising:

a restricted light path structure;

a mechanical and optical connection between said light path structure and said lightguides, said restricted light path structure comprised of said light transmissive material defining an indirect light path between said mechanical and optical connections between said lightguides, where at least one of said light path structure and said two lightguides is fixed.

3. The light dissipating spring according to claim 2, wherein one of said lightguides is fixed relative to the other of said lightguides.

4. The light dissipating spring according to claim 3, wherein said mechanical and optical connections each include an optically small cross section and said restricted light path structure includes at least one optically large cross section, connected to said mechanical and optical connections.

5. The light dissipating spring according to claim 4, wherein each of said lightguides include a relatively smooth surface enhancing reflection of internal light along the lightguide, said optically large cross section includes a textured surface enhancing transmission of light from inside to outside said large cross section.

6. The light dissipating spring according to claim 4, wherein said restricted light path structure includes:

at least two optically large cross sections, each connected to a respective mechanical and optical connection; and an optically small cross section coupling said two optically large cross sections to each other.

7. The light dissipating spring according to claim 6, wherein each of said lightguides includes a relatively smooth surface for enhancing reflection of internal light along the lightguide, said optically large cross sections include a textured surface enhancing transmission of light from inside to outside said large cross sections.

8. The light dissipating spring according to claim 3, wherein said restricted light path structure comprises a plurality of bends between said connections with said lightguides.

9. The light dissipating spring according to claim 8, wherein each of said bends comprises an at least 90 degree bend.

10. The light dissipating spring according to claim 8, wherein said plurality of bends between said connections with said lightguides are in a common plane.

11. The light dissipating spring according to claim 8, wherein said plurality of bends between said connections with said lightguides are in at least two orthogonal planes.

12. The light dissipating spring according to claim 3, wherein said lightguides are in a common plane.

13. The light dissipating spring according to claim 3, wherein said lightguides are in different planes.

14. The light dissipating spring according to claim 3, wherein said at least one fixed lightguide comprises only one fixed lightguide and said at least one moveable lightguide comprises only one moveable lightguide.

\* \* \* \* \*